July 20, 1926.  
T. P. POUGET  
1,593,354

AUTOMATIC SPEED REGULATOR

Filed April 19, 1923

Patented July 20, 1926.

1,593,354

UNITED STATES PATENT OFFICE.

TIMOTHÉE PIERRE POUGET, OF LAVERGNE PAR RIEUPEYROUX, FRANCE.

AUTOMATIC SPEED REGULATOR.

Application filed April 19, 1923, Serial No. 633,285, and in France April 21, 1922.

The invention relates to automatic speed regulators, more especially for use with machines actuating electric current generators.

The object of the invention is to provide improved means for such regulation of simple construction and which is reliable in operation.

The functioning of my improved regulator is based upon the neutralization of two motions, one of which is imparted regularly by any suitable apparatus and tends to open a valve or start an element arranged to start a machine; the other motion being derived from the machine to be regulated, and tending to shut the valve or to neutralize the starting element of the machine.

For this purpose I have invented an apparatus wherein an axle carrying a double system of rotary elements is provided to effect a rotary motion and an axial displacement, in order to actuate the element serving to start a machine and at the same time to cause a connection to be effected between the axis and a first system or set of elements permitting the regulating machine to intervene in the regulator device.

The two motions equilibrate their speed in the regulator, or the speed of the one of these motions exceeds the other, either in order to maintain the valve or the element serving to start the machine, open or to close the same and in the latter case the regular motion is automatically arrested.

One embodiment of the invention is represented in the accompanying drawings. In the same:

The regulator comprises an axle A B C. The end portion A, B of said axle is square in cross section and the opposite end portion B, C thereof is threaded and carries at B a disc a.

Upon the threaded part is arranged a set of rotary elements comprising a threaded tube into which the end portion B C is screwed. This tube carries at one of its extremities a disc c provided with a square hole d at some distance from the circumference and a circular shoulder is provided upon the tube in order to retain the same in a bearing p.

A toothed wheel e is arranged upon the tube, this wheel bearing against the disc c and being provided with a square hole f corresponding to the hole d of the disc c.

Figure 2:
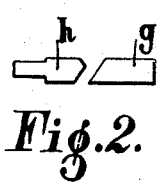
Figure 2 is a detail elevation of the keys.

A key g (Fig. 2) of square cross section and terminating in a slight oblique face at one side, engages the holes d and f. Its length is equal to the thickness of the tooth wheel plus about half of the thickness of the disc c.

A second key h has a cross sectionally square portion terminating obliquely and of a length equal to about half the thickness of the disk c; the other portion of the key being cylindrical and of a length about equal to half the thickness of the disk c plus the thickness of the disk j hereinafter described.

These keys, fixed in the holes d and f, have their inclined faces placed in such direction that the disc c can rotate without taking along the wheel e, because in such movement the key h moves the key g nearly out of the hole d of the disc.

Figure 3:
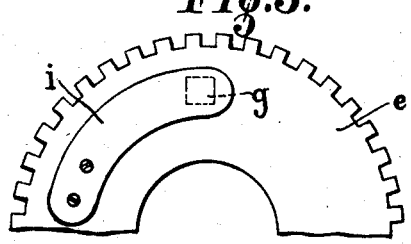
Figure 3 is a detail elevation of the disk e and its connections.

A spring i (Fig. 3) is fixed upon the outer face of the toothed wheel in order to maintain the key g in its seat.

Figure 4:
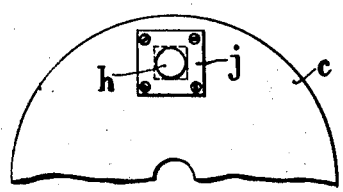
Figure 4 is a similar view of the disk c.

A plate j (Fig. 4) is placed upon the outer face of the disc c and has a cylindrical hole through which the cylindrical part of the key h passes.

A second set of rotary elements c', e' is placed upon the square part of the axle A B. A disc l is keyed to the hub member b' of the disk c' and has circumferential recesses. Said disk c' faces the disk a.

Figure 5:
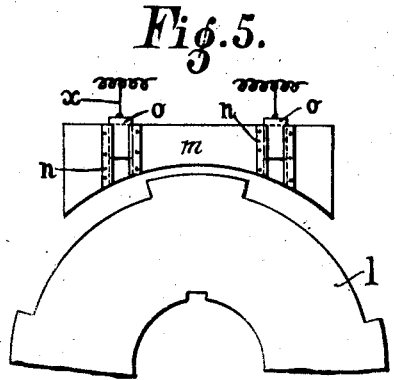
Figure 5 is a similar view of the disk e and plate m.

As shown in Fig. 5 a plate m is provided with vertical slides n and has a curved lower side which is concentric with the disc l so that the slides are arranged above and near to the said disc.

A number of metallic blocks o, equal to the number of slides are arranged for movement in the slides.

They are each provided, at the outer extremity with means by which they are suspended from different melting devices x of a general conductor of the electric power.

The two supporting bearings p and q permit the wheels e, e', to rotate when, owing to the push of the keys h, and h' the keys g and g' have partly left their seats. Said bearings support the hub members b and b' and prevent lateral shifting motion thereof.

Figure 1:
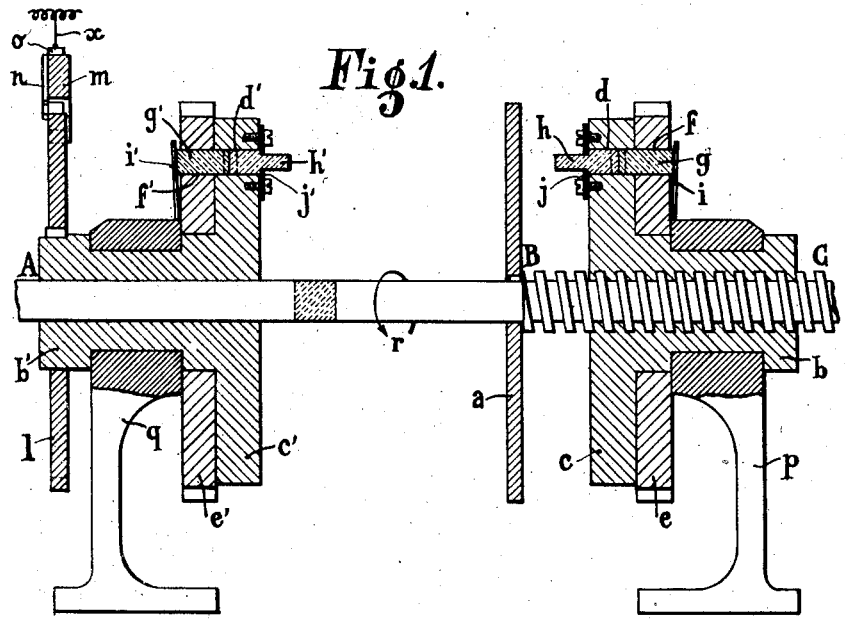
Fig. 1 represents a longitudinal section of the whole regulator.

The operation of this improved regulator is as follows. Let it be assumed that the axle ABC is rotated at a given rate of speed in the direction of the arrow $r$ by the toothed wheel $e'$ and that the latter is driven by a suitable gear of any source of power such as a hydraulic wheel, steam turbine or the like. Such rotation of the axle by reason of its threaded engagement with the hub member $b$ of the disk $c$ causes the axle to move longitudinally to the right as will be understood, the rotation of the gear $e'$ being communicated to the disk $c'$ by the engagement of the key $g'$ in the opening of the disk $c'$ in which the key $h'$ is arranged, said key being maintained in such position by the action of the spring $i'$. Such longitudinal movement of the axle causes the same to actuate the valve or other controlling element of the machine so that the latter is started. Movement of the machine is transmitted to the tooth wheel $e$ in the same direction as the arrow $r$ and hence the hub member $b$ is driven in the same direction by the engagement of the key $g$ in the opening in which the key $h$ of the disk $c$ is fitted, these keys being held normally in the position shown in Figure 1 by the action of the spring $i$. As long as the motion of rotation of the hub member $b$ is inferior to that of the axle ABC, the latter continues its translatory motion AC and continues to open the valve. If the latter is completely opened previous to the machine having attained its normal speed (the one given by the regular motion) the axle ABC is completely moved to the right and the disk $a$ pushes the key $h$ until it has entered entirely. The key $h$ drives the key $g$ beyond the disk $c$ and hence the disk and the tooth wheel are independent. The disk $c$ taken along by the disk $a$ touching it turns more rapidly than the toothed wheel and hence the spindle is no further displaced.

As soon as the speed of the toothed wheel $e$ is superior to the one of the disk $c$, the key $g$ engages said disk $c$. The axle ABC recommences its translatory motion, but now in the reverse direction. The spring $i$ causes the key $g$ to entirely enter the disk $c$, disk $a$ no longer opposing said motion. Finally, after a number of revolutions of the axle, the whole stabilizes itself. The two speeds are then equal.

While running, if an increased output is demanded of the machine, its speed is diminished and at the same time the axle ABC resumes its translatory motion and more widely opens the valve. In the contrary case the inverse procedure results.

In order to suspend the movement of the machine, the regular motion is arrested and the persistent motion of the machine instantly closes the valve.

Since the flywheels maintain slow motion some time after the closing of the valve, the axle ABC being moved completely to the left, the disk $a$ actuates the key $h'$ in the same manner as it formerly actuated the key $h$ in the instant of opening. Hence the tooth wheel and the disk $c'$ are independent.

In the event of a general short circuit, the safety-fuses melt and free the blocks $o$, which drop and engage in the recesses $l^a$ of the disk $l$ and hence suspend the regular motion. At the same time, the valve is closed, as will be understood.

What I claim, is:

An automatic speed regulator comprising a pair of members mounted for rotation and against lateral movement and each provided with a wheel mounted for rotation thereon, each wheel having a key extending through and normally projecting into an opening in the associate member, and a spring to normally hold said key in such normal position, each member also having a key member extending through and projecting from the inner side thereof, said keys and key members having corresponding cam faces at their engaging ends, a shaft extending through said members and arranged for longitudinal movement, said shaft having a noncircular portion correspondingly fitted in one of said members and a threaded portion engaging the other member and also provided with a disk arranged to move with the shaft between the said key members.

In witness whereof I affix my signature.

TIMOTHÉE PIERRE POUGET.